United States Patent
Bourne et al.

[11] Patent Number: 5,984,382
[45] Date of Patent: Nov. 16, 1999

[54] EXTENDED REACH LATCH

[75] Inventors: William R. Bourne, Redondo Beach; Arthur W. Dessenberger, Riverside; Frank T. Jackson, Lake Elsinore, all of Calif.

[73] Assignee: Hartwell Corporation, Placentia, Calif.

[21] Appl. No.: 09/042,235

[22] Filed: Mar. 13, 1998

[51] Int. Cl.[6] .................................................. E05C 1/14
[52] U.S. Cl. .................................... 292/113; 292/DIG. 31
[58] Field of Search .............................. 292/97, 113, 123, 292/167, 247, 256.69, DIG. 49, DIG. 31; 244/129.4

[56] References Cited

U.S. PATENT DOCUMENTS

| | | | |
|---|---|---|---|
| 2,904,141 | 9/1959 | Heinrichs | 189/35 |
| 2,939,734 | 6/1960 | Claud-Mantle | 292/64 |
| 4,053,177 | 10/1977 | Stammreich | 292/113 |
| 4,183,564 | 1/1980 | Poe | 292/113 |
| 4,828,299 | 5/1989 | Poe | 292/139 |
| 5,152,559 | 10/1992 | Henrichs | 292/113 |
| 5,213,286 | 5/1993 | Elliott | 244/129.4 |
| 5,435,615 | 7/1995 | Schmitz | 296/121 |

*Primary Examiner*—Steven Meyers
*Assistant Examiner*—Gary Estrewsky
*Attorney, Agent, or Firm*—Pretty, Schroeder & Poplawski

[57] ABSTRACT

An extended reach latch for an engine cowling and the like, including a housing having a housing slot, a hook pin carried in the housing, a hook having a hook slot, with the hook pin in the hook slot for sliding of the hook relative to the housing, first, second and third links, a first link pin joining the hook and the first link and sliding in the housing slot, a second link pin joining the first and second links, a third link pin joining the second and third links, with the third link pivoting on the hook pin, an outer handle pivotally mounted on the first link pin for movement between an open position and a closed position, and having an outer handle slot for the second link pin, and an inner handle pivotally mounted on the first link pin for movement between an open position and a closed position, and having an inner handle slot for the third link pin, with movement of the inner handle from its open position to its closed position moving the hook into the housing a first distance, and with movement of the outer handle from its open position to its closed position moving the hook into said housing a second lesser distance.

10 Claims, 5 Drawing Sheets

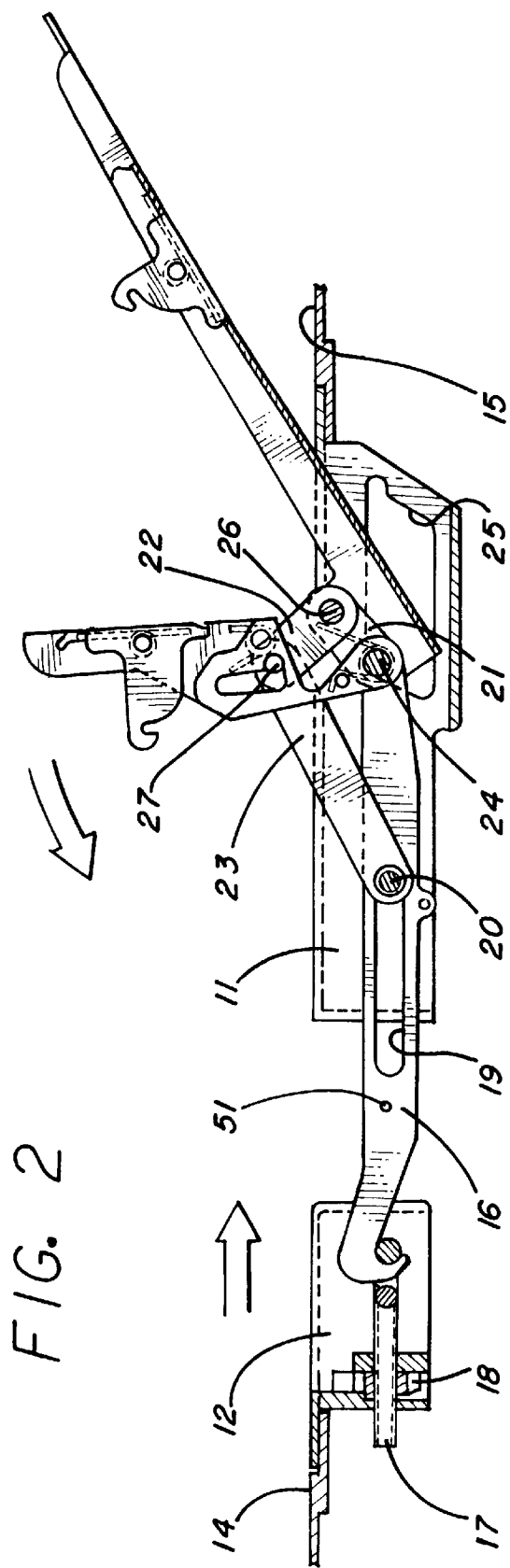
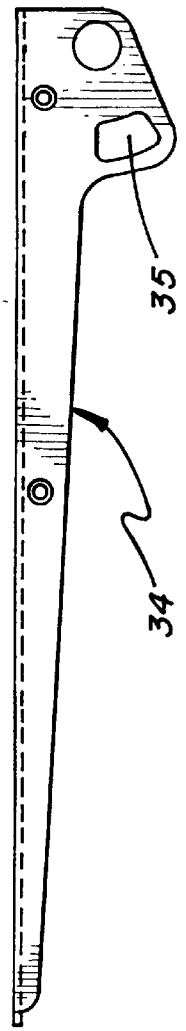
FIG. 2
FIG. 2A

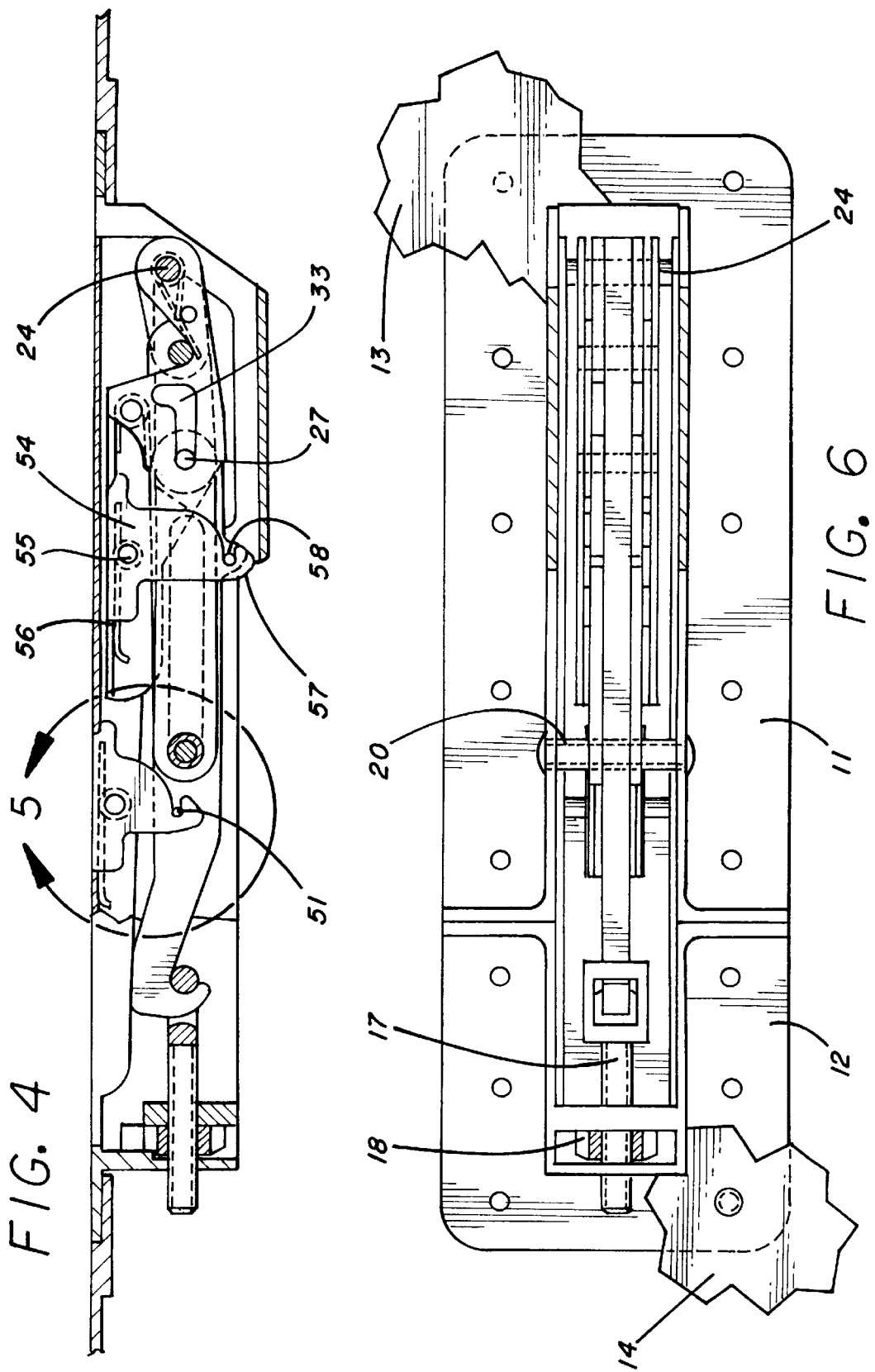

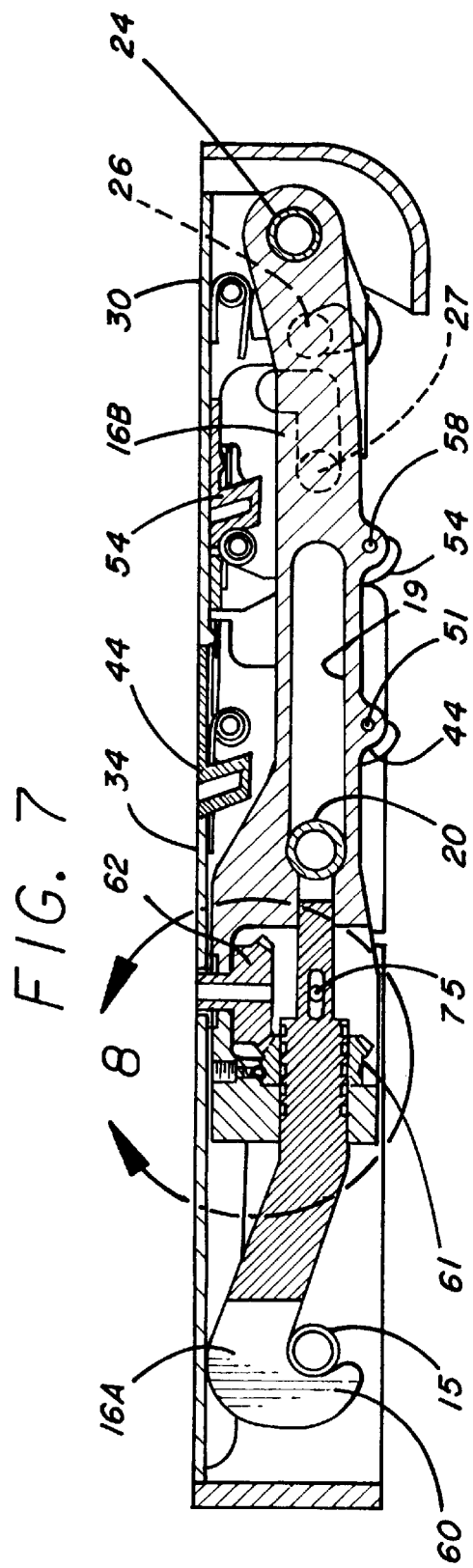
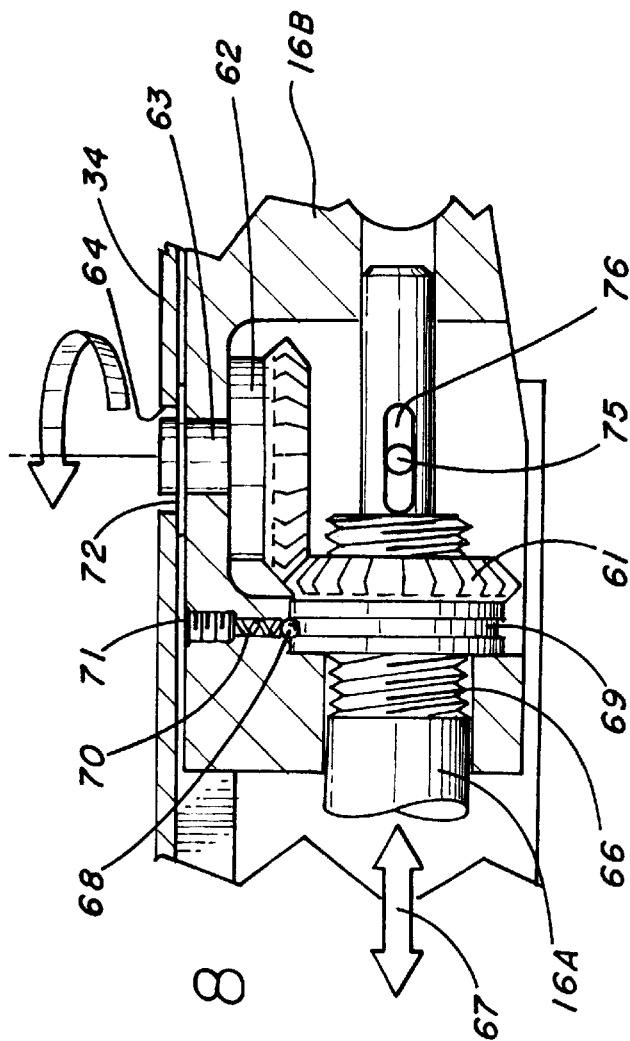
FIG. 7
FIG. 8

EXTENDED REACH LATCH

BACKGROUND OF THE INVENTION

This invention relates to latches for joining two members, which latches exert a pulling force from one member to the other for bringing the two members together during the latch closing operation. The extended release latch of the present invention is suitable for various latching installations, and is particularly adapted for use with aircraft engine cowls.

Aircraft engine cowls are secured by latches for ease of access for maintenance and safety checks. The newer engine cowls are being constructed with a greater number of compressible seals than in the past. As a result, the cowlings not only require more force to close but this force is encountered when the cowlings are spaced further apart.

The new generation engine cowls are larger and have more effective seals along the cowlings. The net effect of more seals and larger seals is to offer more resistance to the cowl closing. In past installations, the weight of the cowls has been sufficient to compress the seals and bring the two portions within the engagement range of the conventional hook latches.

Compression seals in use today are in the order of two and one-half inches in size, which means initial engagement of the hook of the latch with the keeper of the latch must occur with a two and one-half inch gap between the two members being joined. The latch must then function to decrease this gap to zero for compressing the seals and applying a preload to the cowling.

In the present day installations utilizing conventional latches, some additional help is required in initially engaging the latch hook on the keeper. In one approach, several workers are utilized to push the cowlings together, compressing the seals, until the first latch is able to be engaged. In another arrangement, an additional tool, sometimes referred to a come-along, is utilized to initially reduced the gap at the members being joined. Large handle forces are then required to further compress the seals and close the latch.

One previous attempt to solve this problem, as on the Concorde, was to have a single large latch which could be used to engage the two cowl members and to pull them into a proximity whereby smaller structural latches could then be engaged and closed. The disadvantage to this method is that the large latch then becomes unloaded and is carried as a weight penality.

Accordingly, it is an object of the present invention to provide a new and improved latch which can be utilized with newer engine cowls to enable closure with operation by a single worker, while also functioning as a load carrying latch in flight. A latch of this nature is sometimes referred to as an extended reach latch or extended take up latch.

Other objects, advantages, features and results will more fully appear in the course of the following description.

SUMMARY OF THE INVENTION

In its preferred form the extended reach latch of the present invention includes a housing having a housing slot, a hook pin carried in the housing, a hook having a hook slot, with the hook pin in the hook slot for sliding of the hook relative to the housing, first, second and third links, a first link pin joining the hook and the first link and sliding in the housing slot, a second link pin joining the first and second links, a third link pin joining the second and third links, with the third link pivoting on the hook pin, an outer handle pivotally mounted on the first link pin for movement between an open position and a closed position, and having an outer handle slot for the second link pin, and an inner handle pivotally mounted on the first link pin for movement between an open position and a closed position, and having an inner handle slot for the third link pin, with movement of the inner handle from its open position to its closed position moving the hook into the housing a first distance, and with movement of the outer handle from its open position to its closed position moving the hook into the housing a second lesser distance.

The latch of the invention also preferably includes first spring means for urging the outer handle to its open position and including a first spring pin carried on the inner handle and a first spring carried on the first link pin and engaging the second link pin and first spring pin, and second spring means for urging the inner handle into locking engagement with said outer handle and including a second spring pin carried on the inner handle and a second spring carried on the second spring pin and engaging the inner handle and the hook.

The latch further preferably has the inner handle with a generally flat top and the inner handle slot with two portions with a first portion generally parallel to the flat top and a second portion generally perpendicular to the flat top, with the second portion providing a retainer for the second link pin as the inner handle moves from its open position to its closed position.

The latch of the invention also preferably includes an outer trigger pivotally mounted in the outer handle, with the hook including an outer trigger pin for engagement by the outer trigger to hold the outer handle in its closed position, and an outer trigger spring urging the outer trigger into engagement with the outer trigger pin, and an inner trigger pivotally mounted in the inner handle, with the hook including an inner trigger pin for engagement by the inner trigger to hold the inner handle in its closed position, and including an inner trigger spring urging the inner trigger into engagement with the inner trigger pin.

In an alternative embodiment, especially suited for latches for heavier loading, the hook is made in two pieces, with provisions for adjusting the length of the hook to set the preload.

BRIEF DESCRIPTION OF THE DRAWINGS

FIG. 2 is a side view of the latch of FIG. 1, partly in section, with the hook making initial engagement with the keeper;

FIG. 2A is a side view of the outer handle 34;

FIG. 4 is a view similar to that of FIGS. 2 and 3 showing the latch in the fully closed position;

FIG. 5 is an enlarged view taken at the circle 5 of FIG. 4;

FIG. 6 is a bottom view of the latch in the closed position of FIG. 4;

FIG. 7 is a view similar to that of FIG. 4 showing an alternative embodiment of the invention; and FIG. 8 is an enlarged view taken at the circle 8 of FIG. 7.

DESCRIPTION OF THE PREFERRED EMBODIMENTS

Figure 1:
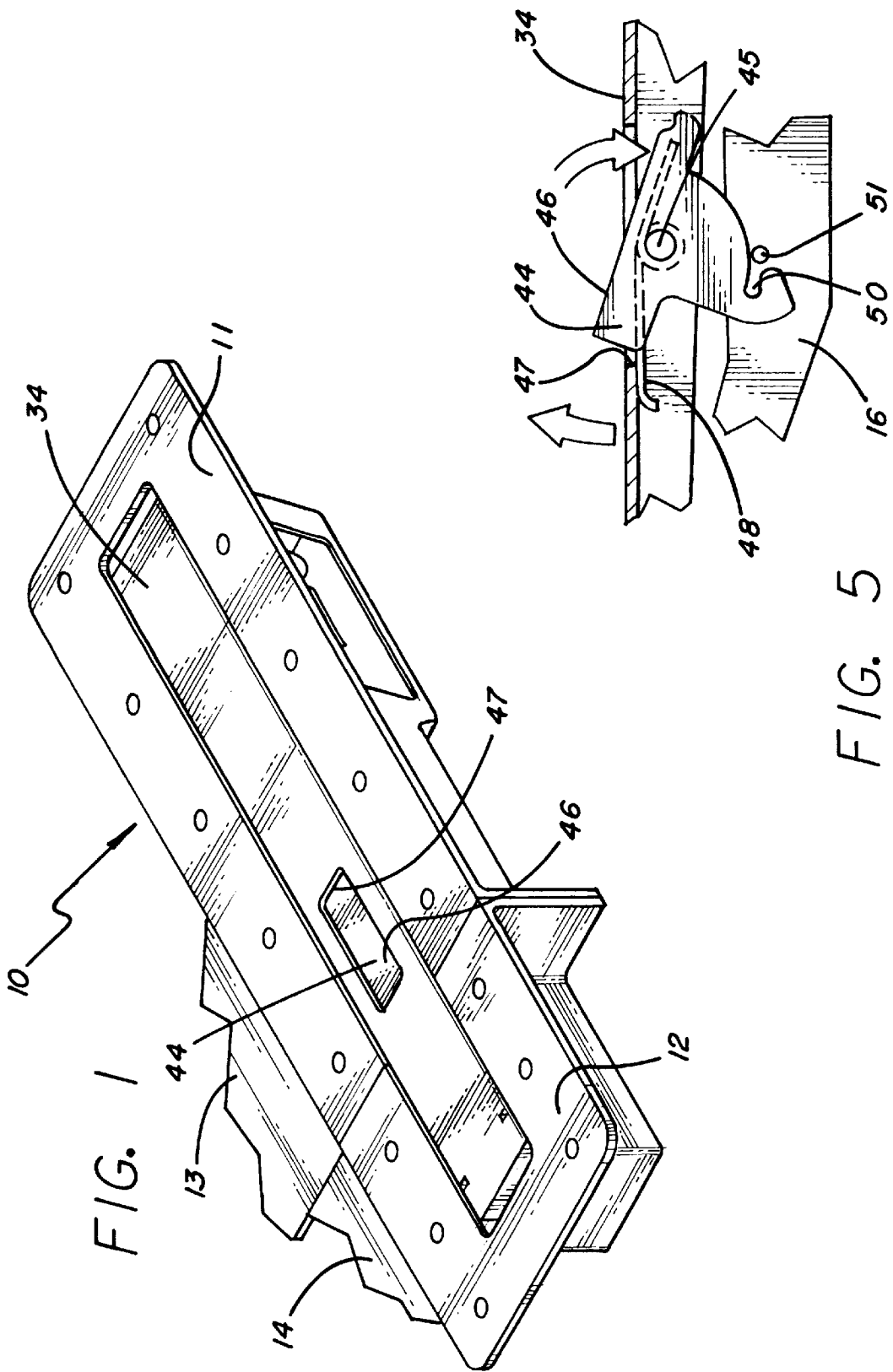
FIG. 1 is a perspective view illustrating an extended reach latch incorporating presently preferred embodiment of the invention, as installed for joining two members together.

In FIG. 1, a latch 10 with a latch housing 11 and a keeper housing 12 is shown with the latch housing fastened to a first member 13 and the keeper housing attached to a second member 14. The latch is in the fully closed position with the first and second members abutting one another.

The keeper housing may be conventional in construction and incorporates a keeper 15 with an eye at one end for receiving a hook 16, and having a threaded section 17 for an adjustment nut 18 which adjusts the position of the keeper in the keeper housing.

The hook 16 has a hook slot 19, with a hook pin 20 riding in the slot and fixed in the housing 11. Typically a hook pin is a rivet with a bushing on the rivet. The latch includes a first link 21, a second link 22, and a third link 23. The first link 21 is joined to the hook 16 by a first link pin 24, which can also ride in a housing slot 25. The first link 21 is joined to the second link 22 by a second link pin 26. The second link 22 is joined to the third link 23 by a third link pin 27.

An inner handle 30 is pivotally connected to the first link pin 21, and preferably is U shaped with a flat top or center section 31 and parallel arms 32. See FIG. 3. The third link pin 27 rides in a slot 33 of the inner handle. Preferably the slot is J shaped, with a longer section generally parallel to the top 31 and a shorter section perpendicular to the top 31.

An outer handle 34 is also pivotally mounted on the first link pin 24. The outer handle also preferably is U shaped similar to the inner handle 30. The second link pin 26 rides in an arcuate slot 35 in the side members of the outer handle. This slot is best seen in FIG. 2A. This slot 35 with the pin 26 therein permits free motion of the outer handle, thereby providing a pop-up feature for the handle.

In the preferred embodiment of the invention, a spring 38 is carried on the first link pin 24, with one end of the spring engaging the second link pin 26 and the other end of the spring engaging a spring pin 39 carried in the inner handle. Also, preferably another spring 40 is carried on a pin 41 in the inner handle, with one end of the spring 40 engaging the inner handle 31 and with the other end of the spring 40 engaging the hook 16. The spring 38 urges the outer handle 34 to the open position, and the spring 40 urges the inner handle 30 to the open position, both as shown in FIG. 2.

An outer trigger 44 is pivotally mounted in the outer handle 34 on a pin 45. The top 46 of the outer trigger 44 fits into a slot 47 in the outer handle, with a spring 48 on the pin 45 urging the outer trigger to the normal rest position of FIG. 1. The outer trigger has a hook 50 which will engage a hook pin 51 carried in the hook 16 when the outer handle is in the closed position of FIG. 4. A downward push on the right end of the outer trigger 46, as shown in FIG. 5, rotates the trigger clockwise against the urging of the spring 48 and disengages the hook 50 from the hook pin 51. This permits the springs 38 and 40 to raise the outer handle from the closed position toward the open position. Then spring 40 goes on to force the inner handle into a position where pin 27 is in the upper most position to lock both inner and outer handles together thereby allowing them to operate as one single handle.

An inner trigger 54 is pivotally mounted on a pin 55 in the inner handle, with a spring 56 on the pin 55 urging the inner trigger to the position as shown in FIG. 4. A hook 57 on the inner trigger engages another hook pin 58 on the hook 16 and retains the inner handle in the closed position of FIG. 4. A downward push on the right end of the inner trigger when the latch is in the position of FIG. 3, releases the inner trigger permitting manual lifting of the inner handle.

In operation, the two members 14, 15 are positioned in alignment with each other, and the hook is engaged with the keeper, in the position of FIG. 2. Typically the gap between the housings 11, 12 is in the order of 2½ inches when full open. Of course, other distances can be utilized as desired, with a 2½ inch spacing being given by way of example.

Figure 3:
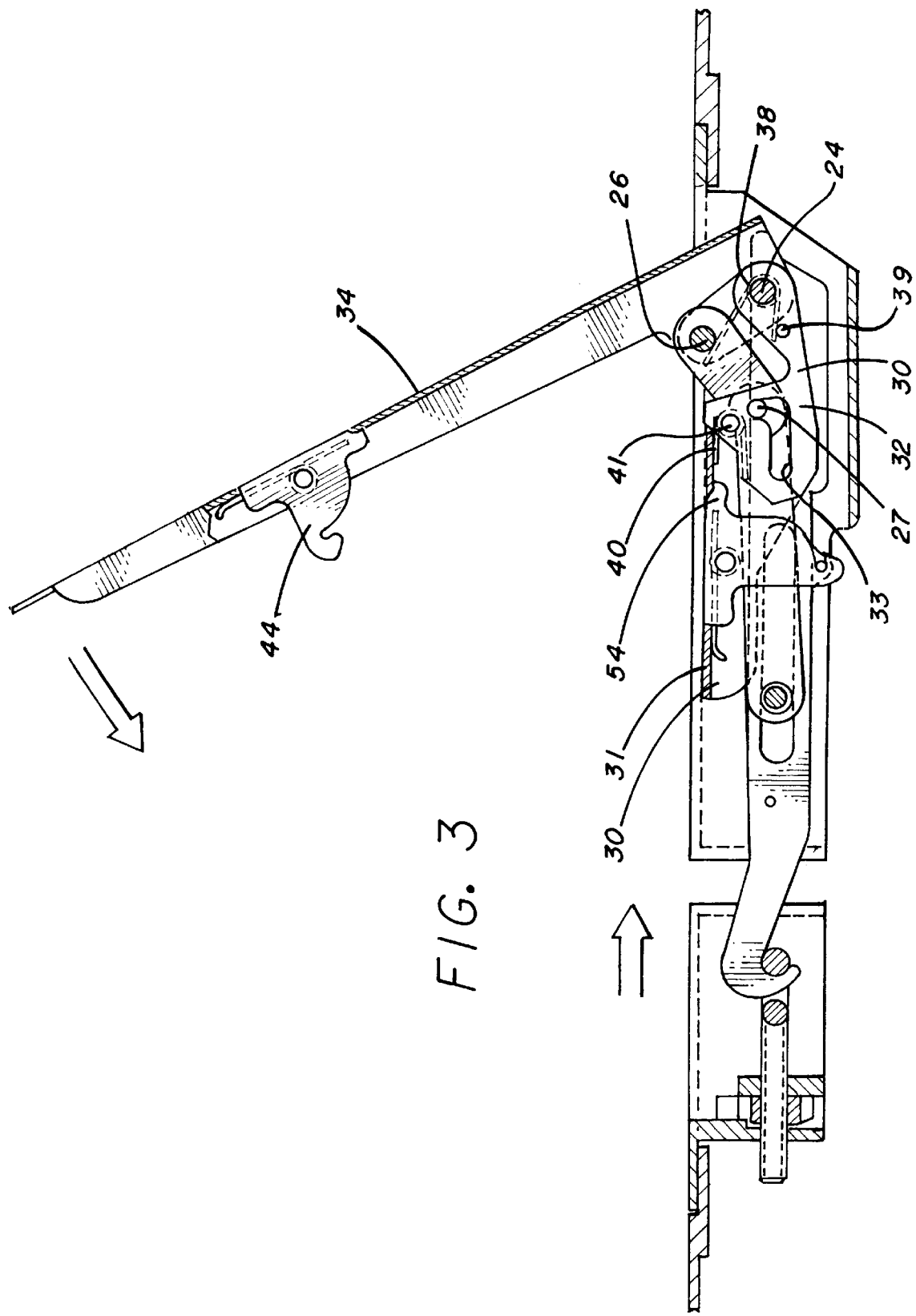
FIG. 3 is a view similar to that of FIG. 2 showing the initial closure of the latch, with a major reduction in the size of the gap.

The inner handle 30 is moved from the open position of FIG. 2 to the closed position of FIG. 3. This brings the two members closer together, typically reducing the gap from 2½ inches to 1½ inch. During this operation the first link 21 and second link 22 remain in the position as shown, with the pin 27 in the short arm of the slot 33. The closure of the inner handle may be accomplished by directly applying pressure to the inner handle or by moving the outer handle from the position of FIG. 2 to the position of FIG. 3, which motion also moves the inner handle from its open position to its closed position. This closing operation requires a relatively smaller closing force for compressing the seal and drawing the cowl members together.

The outer handle 34 then is pushed downward to the position of FIG. 4, completing the closing operation. With this operation, the two housings 11, 12 and the two members 13, 14 are drawn together, completing the closure operation. During this operation, the first and second links 21, 22 move over center from the position of FIGS. 2 and 3 to the position of FIG. 4, with the third link pin 27 moving in the slot 33 from the location of FIGS. 2 and 3 to the location of FIG. 4.

When the inner handle is closed, the inner trigger 54 engages the trigger pin 58, rotating the trigger a bit clockwise. At the completion of the handle closure, the hook slides over the pin and engages the pin, as seen in FIG. 4.

Similarly, when the outer handle is closed, the hook of the outer trigger 44 rides over the pin 51 and then engages with the pin to lock the outer handle in the closed position of FIG. 4. The latch is released by pushing downward on the outer trigger to release the outer handle and then pushing down on the inner trigger to release the inner handle.

The extended reach latch of the invention provides an increase in take up or reach to allow one workman to close an engine cowling. The extra reach enables the operator to connect the hook to the mating keeper. The two stage closing motion of the handles provides increased mechanical advantage for compressing the seals and bringing the cowling tightly together with a preload as desired. The latch operates as a large double link latch with a large take up as the inner handle is closed, with the double link being the third link 23 and the first and second links 21, 22 acting as a single link.

As the outer handle is moved to the closed position, the latch then in effect becomes a second double link latch with smaller links and more mechanical advantage. In this smaller double link latch mode, the links are the first link 21 and the second link 22 which move over center from the position of FIGS. 2 and 3 to the position of FIG. 4.

The alternative embodiment illustrated in FIGS. 7 and 8 operates in the same manner as the embodiment of FIGS. 1–6. In this second embodiment, ordinarily a significantly stronger hook and keeper are used. Also, the hook is made in two sections 16A, 16B, with the overall length of the hook being adjustable. The keeper end of the hook is slotted to provide two spaced fingers 60 for engaging the keeper 15. The spaced finger construction in the hook allows for uneven wear, lowers the weight of the hook and provides a better load path into the pin with less bending on the pin.

In the embodiment illustrated in FIGS. 7 and 8, a bevel gear 61 is carried on the hook section 16A and a bevel gear 62 is carried in the hook section 16B. The shaft 63 of the bevel gear 62 rotates in the hook section 16B and projects into an opening 64 in the outer handle 34. Typically the shaft 63 has a hexagonal opening in the outer end for rotation of the bevel gear 62 by an Allen key or other similar tool.

The bevel gear 61 is also mounted in the hook section 16B for rotation about an axis perpendicular to the axis of the rotation of the bevel gear 62.

The inner passage of the bevel gear 61 is threaded for positioning on the externally threaded portion 66 of the hook section 16A. Rotation of the bevel gear 62 produces rotation of the bevel gear 62 and translation of the hook section 16A relative to the hook section 16B. This translation motion is indicated by the arrow 67. A ball 68 rides in a pheriphial groove 69 in the bevel gear 61, and is held in place by a spring 70 and a set screw 71 positioned in the hook section 16B. The bevel gear 62 is held in place in the hook section 16B by a snap ring 72 or similar item which rides in a groove in the shaft 63 of the bevel gear 62. A pin 75 carried in the hook section 16B rides in an axial slot 76 in the hook number 16A for the purpose of preventing turning of the hook when the latch is open.

The latching and unlatching operation of the latch FIGS. 7 and 8 is the same as for the latch of FIGS. 1–6. The adjustable length arrangement for the hook provides for easy and precise setting of the preload of the latch.

Features and advantages of the embodiment of FIGS. 7 and 8 include the preload on the latch can be adjusted without opening the handle, and the preload on the latch can be measured by the direct torque on the bevel gear 62 at the opening for the Allen key. This easier measurement allows a torque wrench to be directly applied.

We claim:

1. In an extended reach latch for joining two members, the combination of:

a housing having a housing slot;

a hook pin carried in said housing;

a hook having a hook slot, with said hook pin in said hook slot for sliding of said hook relative to said housing;

first, second and third links;

a first link pin joining said hook and said first link and sliding in said housing slot;

a second link pin joining said first and second links;

a third link pin joining said second and third links, with said third link pivoting on said hook pin;

an outer handle pivotally mounted on said first link pin for movement between an open position and a closed position, and having an outer handle slot for said second link pin; and an inner handle pivotally mounted on said first link pin for movement between an open position and a closed position, and having an inner handle slot for said third link pin;

with movement of said inner handle from its open position to its closed position moving said hook into said housing a first distance, and with movement of said outer handle from its open position to its closed position moving said hook into said housing a second lesser distance.

2. A latch as defined in claim 1 including first spring means for urging said outer handle to its open position, said first spring means including a first spring pin carried on said inner handle and a first spring carried on said first link pin and engaging said second link pin and said first spring pin.

3. A latch as defined in claim 2 including second spring means for urging said inner handle into locking engagement with said outer handle, said second spring means including a second spring pin carried on said inner handle and a second spring carried on said second spring pin and engaging said inner handle and said hook.

4. A latch as defined in claim 1 wherein said inner handle has a generally flat top and said inner handle slot has two portions with a first portion generally parallel to said flat top and a second portion generally perpendicular to said flat top, with said second portion providing a retainer for said second link pin as said inner handle moves from its open position to its closed position.

5. A latch as defined in claim 1 including an outer trigger pivotally mounted in said outer handle, with said hook including an outer trigger pin for engagement by said outer trigger to hold said outer handle in its closed position, and including an outer trigger spring urging said outer trigger into engagement with said outer trigger pin.

6. A latch as defined in claim 5 including an inner trigger pivotally mounted in said inner handle, with said hook including an inner trigger pin for engagement by said inner trigger to hold said inner handle in its closed position, and including an inner trigger spring urging said inner trigger into engagement with said inner trigger pin.

7. A latch as defined in claim 1 including means for varying the length of said hook between a first hook section which engages a keeper and a second hook section which engages said first link pin.

8. A latch as defined in claim 7 wherein said means for varying the length includes means for sliding said first hook section in said second hook section along a first axis, a first bevel gear carried in said second hook section for rotation about said first axis, a second bevel gear carried in said second hook section for rotation about a second axis perpendicular to said first axis, with said bevel gears engaged so that rotation of said first bevel gear will rotate said second bevel gear, with said second bevel gear and said second hook section having interengaging threads so that rotation of said second bevel gear translates said second hook section along said second axis.

9. In an extended reach latch for joining two members, the combination of:

a housing having a housing slot;

a hook pin carried in said housing;

a hook having a hook slot, with said hook pin in said hook slot for sliding of said hook relative to said housing;

first, second and third links;

a first link pin joining said hook and said first link and sliding in said housing slot;

a second link pin joining said first and second links;

a third link pin joining said second and third links, with said third link pivoting on said hook pin;

an outer handle pivotally mounted on said first link pin for movement between an open position and a closed position, and having an outer handle slot for said second link pin;

an inner handle pivotally mounted on said first link pin for movement between an open position and a closed position, and having an inner handle slot for said third link pin;

first spring means for urging said outer handle to its open position, said first spring means including a first spring pin carried on said inner handle and a first spring carried on said first link pin and engaging said second link pin and said first spring pin;

second spring means for urging said inner handle into locking engagement with said outer handle, said second spring means including a second spring pin carried on said inner handle and a second spring carried on said second spring pin and engaging said inner handle and said hook;

an outer trigger pivotally mounted in said outer handle, with said hook including an outer trigger pin for engagement by said outer trigger to hold said outer handle in its closed position, and including an outer trigger spring urging said outer trigger into engagement with said outer trigger pin; and an inner trigger pivotally mounted in said inner handle, with said hook including an inner trigger pin for engagement by said inner trigger to hold said inner handle in its closed position, and including an inner trigger spring urging said inner trigger into engagement with said inner trigger pin;

with movement of said inner handle from its open position to its closed position moving said hook into said housing a first distance, and with movement of said outer handle from its open position to its closed position moving said hook into said housing a second lesser distance.

10. A latch as defined in claim 9 wherein said inner handle has a generally flat top and said inner handle slot has two portions with a first portion generally parallel to said flat top and a second portion generally perpendicular to said flat top, with said second portion providing a retainer for said second link pin as said inner handle moves from its open position to its closed position.

\* \* \* \* \*